UNITED STATES PATENT OFFICE.

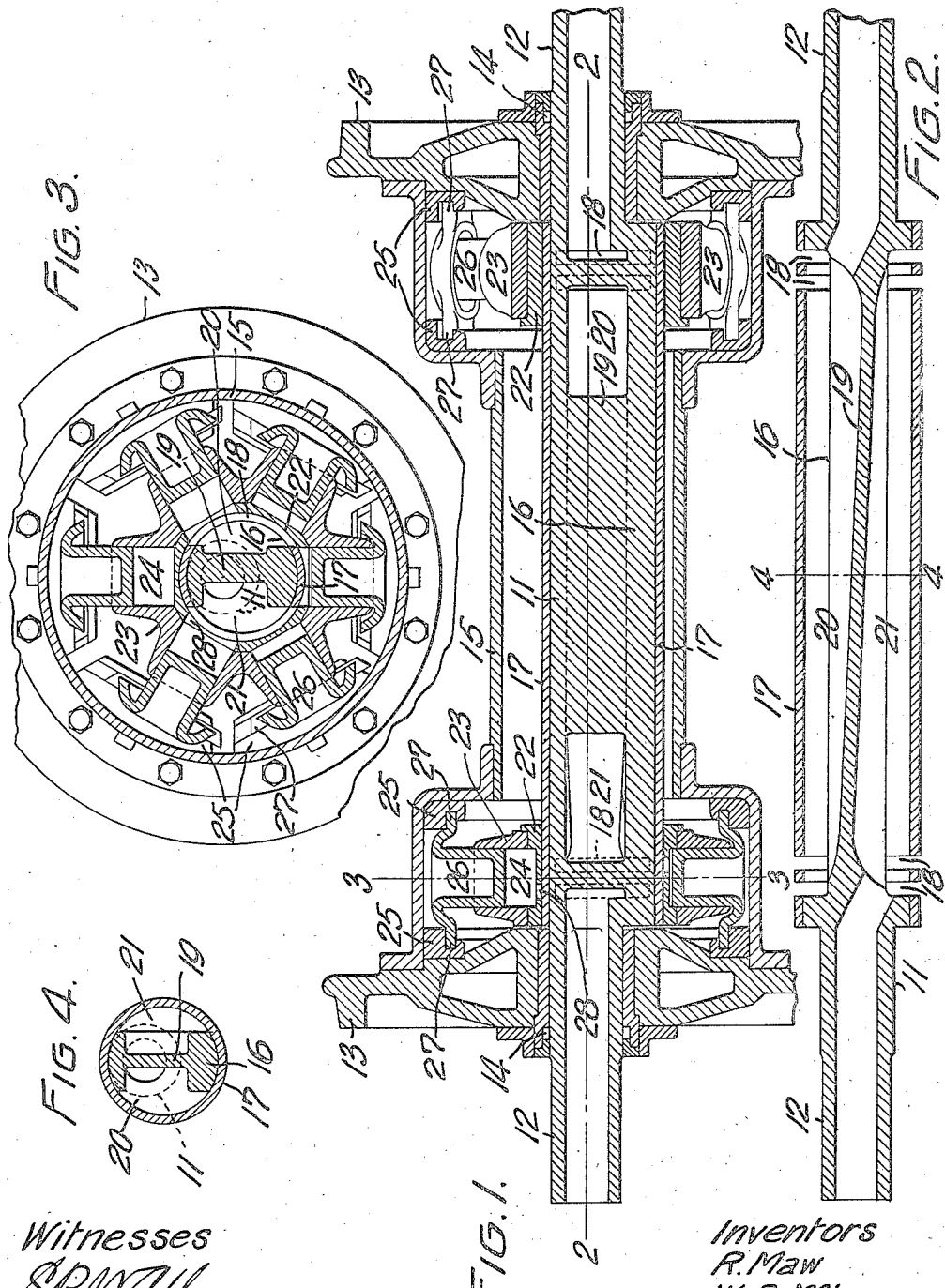

ROBERT MAW AND WILLIAM B. McLEAN, OF MONTREAL, QUEBEC, CANADA.

COMBINED PUMP AND MOTOR.

1,193,283.  Specification of Letters Patent.  Patented Aug. 1, 1916.

Application filed May 29, 1914. Serial No. 841,968.

*To all whom it may concern:*

Be it known that we, ROBERT MAW and WILLIAM B. MCLEAN, citizens of the Dominion of Canada, and residents of the city of Montreal, in the Province of Quebec, and Dominion of Canada, have invented certain new and useful Improvements in Combined Pumps and Motors, of which the following is a full, clear, and exact description.

This invention relates to improvements in combined pumps and motors, and the main object of the invention is to provide an apparatus which will act as a pump when the driven members become driving members, and as a motor when liquid is supplied under pressure at either the inlet or discharge ends.

A further object is to provide a machine of great strength and durability capable of withstanding hard usage, and adapted to operate with liquids under great pressure.

A still further object is to provide a device of this character mounted directly on the axle of a vehicle, so as to have a driving or braking effect on the vehicle according as the pressure of the liquid is regulated.

Still another object is to provide a machine of this class so arranged that the power delivered or absorbed by the machine will be entirely free from pulsations.

To accomplish the above objects, a pair of machines are provided each having preferably six cylinders. These machines are mounted near the ends of a vehicle axle, preferably between the wheels, and are inclosed in a casing attached to the wheels and surrounding the axle between the wheels. These cylinders are radially disposed, the cylinders of one machine being arranged intermediate the cylinders of the other. The vehicle axle is made hollow for the passage of the liquid, and is provided within each machine with an eccentric portion, by means of which pistons are reciprocated within the cylinders, or by their reciprocation rotate the machines around the axle and thus rotate the wheels.

In the drawings which illustrate the invention:—Figure 1 is a longitudinal section through the center of the device. Fig. 2 is a longitudinal section of the vehicle axle on the line 2—2, Fig. 1. Fig. 3 is a vertical cross sectional view on the line 3—3, Fig. 1. Fig. 4 is a cross sectional view of the axle on the line 4—4, Fig. 2.

Referring more particularly to the drawings, 11 designates the axle of a vehicle which is held against rotary motion. In the form illustrated, the device is adapted for use with a street or railway car or other vehicle traveling on rails, and the axle is therefore supported at its ends 12 in the trucks. The wheels 13 are of substantially the usual type and are revolubly mounted on the axles by means of stuffing boxes 14. A casing 15 made in any suitable number of parts extends between the wheels and is rigidly attached thereto. This casing contains rigidly attached thereto the liquid circulating machines.

The axle 11 is hollow from end to end and is provided between the wheels with an enlarged portion 16 eccentric with respect to the end portions. The portion of the axle is cut away on opposite sides through approximately one third of its circumference, as clearly seen in Figs. 3 and 4, and is inclosed within a cylindrical shell 17, near the ends of which suitable ports 18 are formed extending through approximately one-third of the circumference. These ports are formed in pairs on opposite sides of the shell, as clearly shown in Figs. 2 and 4, and register with the openings of the eccentric axle portion 16. The interior of the eccentric portion is divided into two compartments by a longitudinal wall 19 which is arranged diagonally, so that the hollow ends of the axle connect with the chambers 20 and 21 formed on opposite sides of the wall 19. This wall is so disposed that all the ports on one side connect with a single chamber.

Each liquid circulating machine comprises a substantially hexagonal hub 22 revoluble on the sleeve 17. Surrounding this hub is a cylinder member 23 having a plurality of radially disposed bores 24; in the form shown in the drawing six in number, and closed at the inner ends by the faces of the hub, as clearly shown in Fig. 3. Within the casing 15 a plurality of guides 25 are arranged in pairs parallel with the faces of the hub. The pistons 26, which are of the trunk variety and operate in the cylinder bores 24, are provided at their free ends with outwardly turned flanges 27 which engage in the guides 25 and hold the pistons against movement either toward or away from the center of the casing, but permit a slight movement in a direction parallel with the hub faces, as will be clearly seen in Fig. 3. Ports 28 are formed through the hub connecting alternate cylinder bores with the sleeve ports 18. The reason for this particular arrangement is obviously that placing the ports 28 all in line would too greatly weaken the hub, so they are, therefore, arranged in two rows.

The operation of the device is extremely simple. It will be seen from Figs. 2 and 3 that the wall 19 separates the ports 18 on one side of the sleeve from those on the other side, so that the ports on one side are in communication only with one end of the axle, while the ports on the other side are in communication only with the other end of the axle. The casing 15 which carries the pistons is concentric with the axis of the axle, while the cylinder member 23 is concentric with the eccentric portion 16 of the axle. It is therefore obvious that when the casing and axle are relatively revolved, reciprocatory motion will be induced between the pistons and cylinders. It will also be seen that the wall 19 is located substantially in the plane containing the axes of the axle and the eccentric portion thereof, so that all outward movement of the piston will occur on one side of this wall, and all inward movement on the opposite side thereof. During the outward movement of the pistons, oil flows in at one end of the axle, passes through the ports 18 and 28 to fill the cylinder bores. When these cylinder bores are full, they are located intermediate the ports 18, and as the inward movement of the pistons commences, the ports 28 come into register with the ports 18 on the opposite side of the wall 19, so that the oil passes out through the opposite end of the axle.

In the case of a vehicle, it will be seen that as long as the vehicle moves ahead, that is, the wheels move in a positive direction, the liquid will circulate in one direction regardless of whether pressure is at the intake or discharge end of the axle. By applying pressure to the liquid at the intake end, the liquid will obviously operate the machine and produce rotation of the wheels. In the same way, if pressure is applied to the liquid at the discharge end, the resistance will tend to stop rotation of the wheels. In this way, a single machine may be used to stop or start a vehicle by simply governing the application of pressure to the liquid. If it is desired to run the vehicle in a reverse direction, it is obviously only necessary to reverse the direction of circulation of the liquid. If there is no pressure applied at either end, the liquid will circulate freely and practically no power be absorbed or expended. The slight lateral movement of the pistons due to the eccentric disposition of the cylinder member is allowed for by the slidable mounting of the pistons.

While the device has been shown and described only as applied to a vehicle, it is obvious that it may be applied to any class of machinery, the axle 11 being either a part of the machine or suitably geared thereto.

Having thus described our invention, what we claim is:—

1. A device of the character described comprising a hollow axle, an eccentric portion thereon, and a wall dividing said axle into two chambers arranged in the plane of the axis of said axle and eccentric portion thereof.

2. A device of the character described comprising an axle having inlet and outlet passages therethrough, an eccentric portion on said axle, a casing concentric with the axle, pistons in said casing, and a cylinder member on the eccentric portion of the axle coöperating with said pistons.

3. A device of the character described comprising an axle having inlet and outlet passages, an eccentric portion on said axle, a casing revoluble on the axle and concentric therewith, pistons in said casing, a cylinder member revoluble on the eccentric portion of the axle coöperating with the pistons, and ports in said cylinder member communicating with the inlet passage during outward piston movement and with the outlet passage during inward piston movement.

4. A device of the character described comprising an axle, an eccentric portion thereon, a casing concentric with the axle, a cylinder member revoluble on the eccentric portion, pistons in the casing coöperating with said cylinder member, guides holding said pistons against movement toward or away from the casing axis and permitting lateral movement of the pistons.

5. A device of the character described comprising an axle, an eccentric portion thereon, a casing concentric with said axle, a cylinder member revoluble on the eccentric portion, pistons in the casing coöperating with said cylinder member, and means supporting said pistons in the cylinder and permitting lateral movement without oscillation.

6. A device of the character described comprising an axle having inlet and outlet passages at opposite ends thereof, a diametrically disposed wall in the axle separating said inlet and outlet passages, an eccentric portion on said axle, ports in said eccentric portion communicating with the inlet and outlet passages, a cylinder member revoluble on the eccentric portion, a casing concentric with the axle, pistons in said casing coöperating with the cylinder member, and ports in said cylinder member communicating with the inlet passage ports during relative outward movement and with the outlet passage ports during relative inward piston movement.

7. In a device of the character described, a hollow axle, an eccentric portion on said axle intermediate the ends thereof, a diametric wall in said eccentric portion located in the plane of the axle and eccentric portion axes separating the hollow interior of the axle into inlet and outlet passages, a sleeve rigidly mounted on the eccentric portion of said axle, ports in said sleeve communicating with the inlet passage, and ports in said sleeve communicating with the outlet passage.

8. In a device of the character described, an axle, an eccentric portion intermediate the ends of said axle, inlet and outlet passages arranged on opposite sides of the plane containing the axle and eccentric portion axes, a polygonal hub revoluble on the eccentric portion, a cylinder member on said hub having a plurality of bores closed at their inner ends by the faces of the hub, ports in said hub arranged to connect the cylinder bores alternately with the inlet and outlet passage ports, a casing concentric with the axle, pistons laterally movable in said casing coöperating with the cylinder member, and running wheels revolubly mounted on the axle fixed to said casing.

In witness whereof, we have hereunto set our hands in the presence of two witnesses.

ROBERT MAW.
WILLIAM B. McLEAN.

Witnesses:
S. R. W. ALLEN,
G. M. MORELAND.